June 17, 1952  P. ROSENTHAL ET AL  2,601,128
REFRACTOMETER WITH TEMPERATURE COMPENSATING MEANS
Filed Jan. 11, 1950
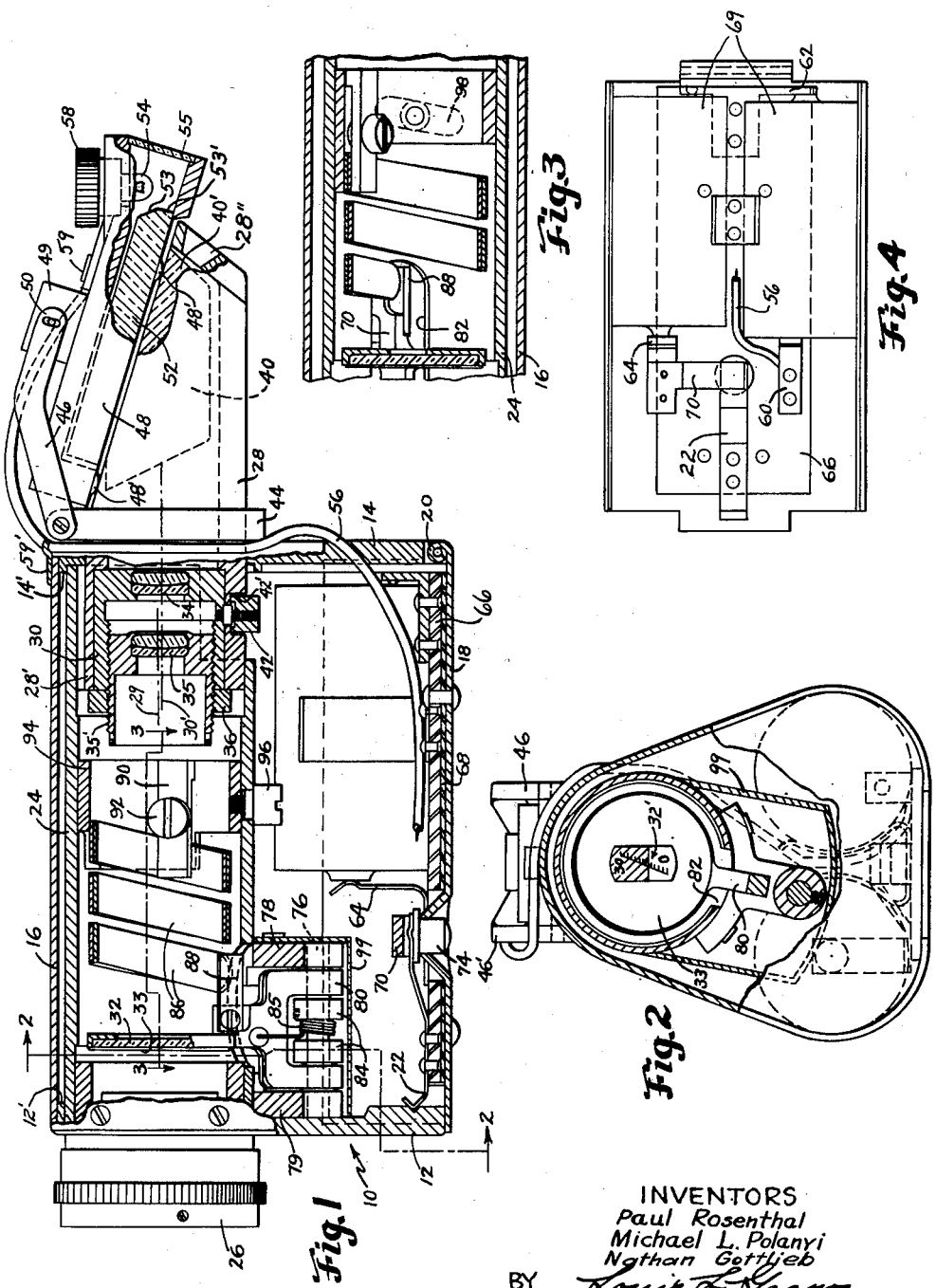
INVENTORS
Paul Rosenthal
Michael L. Polanyi
Nathan Gottlieb
BY
ATTORNEYS Patented June 17, 1952

2,601,128

UNITED STATES PATENT OFFICE 2,601,128

REFRACTOMETER WITH TEMPERATURE COMPENSATING MEANS

Paul Rosenthal, Michael L. Polanyi, and Nathan Gottlieb, Buffalo, N. Y., assignors to American Optical Company, Southbridge, Mass., a voluntary association of Massachusetts Application January 11, 1950, Serial No. 137,964

10 Claims. (Cl. 88—14)

This invention relates to refractometers and like measuring instruments, and more particularly to hand refractometers and the like which may be readily moved from place to place and held in the hand of an operator while making readings of refractive index of solutions or the like.

In refractometry, it is well known that the refractive index of a solid dissolved in a solution is not only dependent upon the percentage concentration of the solution but also upon the temperature of the solution at the time at which a reading is taken. It has been common practice heretofore, when using instruments of the type described, to take a reading on the refractive index scale of the instrument, by determining the location at which the boundary line between the lighted and unlighted areas occurs as well as a temperature reading of the solution by means of a conventional thermometer, so that a true or temperature compensated value of index could then be obtained from a suitable correction table or chart. Obviously, such earlier instruments were not entirely satisfactory since the correct refractive index could not be read directly from the scale of the instrument. Furthermore, there was always the possibility that error might occur when a table or chart had to be consulted for the final index value and the corresponding percentage concentration value of the solution. While both the refractive index and the temperature of a solution are functions of the concentration thereof, neither is a lineol function and accordingly it has been a difficult problem to provide in a refractometer an arrangement to give from a single scale reading a true indication of refractive index (or percentage concentration) value of the material being examined. However, in copending application Serial No. 130,960, filed December 3, 1949, in the name of M. L. Polanyi, a novel arrangement of parts in a refractometer are shown wherein correct readings may be obtained directly from the scale of the instrument.

It is accordingly an object of the present invention to provide in a hand refractometer or the like, temperature compensating means compactly incorporated in the instrument in such a manner that correct values of percentage concentration, or refractive index, or both, of the material or solution being measured may be automatically indicated upon the reading scale of the instrument.

It is a further object of the invention to provide in such an instrument a construction and arrangement of parts which enables the index scale to be moved about a predetermined pivotal center and allows the temperature compensating means to be accurately adjusted into a proper operative position relative thereto. The parts are also constructed and arranged so that excessive temperature changes, beyond the normal range of the instrument will not cause injury therein.

It is a further object of the invention to provide in such a refractometer or the like a self-contained light source so that the instrument may be illuminated thereby or by external light, as desired, and according to the conditions under which the instrument is being used.

It is a further object of the invention to provide in conjunction with the means for effecting automatic temperature compensation, a construction and arrangement of parts which will prevent errors due to the heat from the hand of the operator holding the instrument from occurring during use of the instrument.

It is an additional object of the invention to provide simple and readily adjustable means which may be employed for accurately effecting a predetermined relation between the scale of the instrument and the boundary line shadow cast thereon.

It is also an object of the invention to provide for such a refractometer or the like a hinged cover construction which allows easy assembly thereof and accurate positioning of the illuminating prism carried thereby so as to form with its associated measuring prism a specimen receiving chamber of exact predetermined characteristics.

It is a further object to provide in the instrument of the present invention, which is to be used with white light, optical elements of predetermined characteristics for effecting achromaticity, so that all graduations or divisions of the scale of the instrument will appear substantially free from color aberrations and therefore may be read with great accuracy.

Other objects and advantages of the invention will become apparent from the detailed description which follows when taken in conjunction with the accompanying drawing, in which:

Fig. 1 is a side elevational view of a hand refractometer embodying the present invention and useful for measuring transparent, semitransparent and turbid solutions, parts of the instrument being broken away to better show details of construction;

Fig. 2 is a sectional view taken substantially on line 2—2 of Fig. 1 and looking in the direction of the arrows;

Fig. 3 is a partial sectional view taken substantially along line 3—3 of Fig. 1 and looking in the direction of the arrows; and Fig. 4 is a view of a hinged bottom section of the instrument and parts carried thereby, same being shown on a somewhat reduced scale.

Referring to the drawing in detail and particularly Fig. 1, the numeral 10 indicates generally a hand refractometer comprising a pair of apertured end plates 12 and 14 secured to the opposite ends of an outer casing member 16 which encompasses the top and opposite side edges of these plates to form the main body of the instrument. A lower plate or cover member 18 forms the bottom wall of the casing and is hinged to end plate 14 at one end so as to swing about a pintle 20. The cover is retained in closed position by a resilient latch bar 22 carried on the inside of the cover member in a manner to be more fully hereinafter described.

Arranged in alignment with a pair of openings in the end plates 12 and 14 is an inner tubular housing or telescope tube 24 spaced from housing 16. Housing 24 has one end thereof confined by an inwardly directed circular flange 14' upon plate 14 and the opposite end extends through one of said aligned openings so as to be encircled by portion 12' of plate 12. Upon this end of housing 24 is arranged an axially adjustable or focusable eye lens 26 while into the opposite end thereof, extending through the opening in the plate 14, the tubular inner end 28' of a fixed prism supporting member 28. Within the tubular inner end portion 28' is rotatably carried a cylindrical objective lens cell 30 which has its optical axis 30' in eccentric relation relative to the longitudinal center line 29 of the tubular portion 28' but nevertheless in substantially parallel relation to the optical axis of the eye lens 26. Between the eye lens and the cell 30 is located a glass screen 32 or the like carrying a reticule or scale 32' thereon (see Fig. 2), and between this screen and the eye lens a filter of suitable material could be located to improve the achromaticity of the division lines on the scale when the instrument is to be operated with white light and, of even more importance, when the instrument is used to measure refractive indices of liquids of different dispersive characteristics from those of the particular kind of solution for which the instrument is designed. In the present instrument (which is designed for use with sugar solutions from 0 to 30%) substantially complete achromaticity is obtained by the use of an eye lens system having a definite predetermined amount of lateral color which will be substantially equal to but opposite that produced by the dispersion of the solution. If an acromatic eye lens were used, no color would appear at the center of the scale (near the 15% division) but objectionable color aberration, which might be as much as or more than one division (0.2%), would be present near the ends of the scale. However, with a color compensating eye lens of proper predetermined properties, lateral color achromaticity throughout the length of the scale can be substantially completely obtained.

The reticule on screen 32 is located substantially at the rear focal plane of an objective lens system comprising a pair of doublets 34 and 35 carried by the objective lens cell 30 and, in order that the objective may accurately focus the refractive index boundary line thereon, the rear doublet 35 of said objective may be carried in an adjustable ring 35' which may be moved axially. This ring may be locked in place by a nut or collar 36.

Within the exposed portion of the prism supporting member 28 is cemented or otherwise secured and housed a refraction measuring prism 40 of known design and made in accordance with with particular range of indices which are to be measured by the instrument. The angle of emergence of the light from the prism shown in the instrument of the drawing is approximately 46 degrees and intended for use in the 0 to 30% sugar refractometry range. Other prisms for other ranges could, obviously, be substituted. Light for forming the boundary line will travel from the prism substantially parallel to the optical axis of the objective so as to be focused thereby at the plane of the scale 32' and the parts are so constructed and arranged that the boundary line, when distilled water is in the instrument and the instrument is at a preselected normal temperature, will fall substantially upon the zero graduation of the scale.

In order to assure that this boundary line will, under this normal condition, exactly coincide with a preselected part (generally the zero graduation) on the scale, the objective cell may be rotated in its supporting recess in the prism supporting portion 28' and about the longitudinal center line 29 so that the axis 30' of the objective may be shifted slightly up or down to effect an accurate zero adjustment. Such rotational adjustment may be brought about by movement of a projecting bolt and nut 42, secured to the cell 30 and projecting outwardly through an arcuate slot 42' in the portion 28', after which this nut may be screwed down tightly so as to lock the objective cell in its recess and against any further angular displacement.

Encircling the prism supporting member 28 adjacent the plate 14 is a band-like link supporting member 44 which may be secured in fixed position by suitable means such as a set screw or the like, not shown, and this member 44 is arranged to hingedly support at its upper corners a pair of links 46, 46' for pivotal movement so that a cover plate 48 secured to a block 49 connected by slot-and-pin connections 50 to the outer free ends of the links may be swung upwardly from its operative position shown in Fig. 1 to an inoperative position materially spaced from the measuring prism 40. The cover member 48 is of a hollow construction and is arranged to receive an illuminating prism 52 cemented or otherwise secured therein. The prism has a diffusing front surface facing prism 40, an angularly disposed outer surface 53 in close proximity to a small illuminating bulb 54 and a second outer surface 53' facing window 55 for the admission of external light, when desired.

A set of three pins 48' secured in cover 48, one centrally at the rear and two forward pins bearing against the side edges of member 28 when the cover is closed, serves as triangularly spaced supporting means for forming a parallel sided material receiving chamber of exact predetermined thickness between prisms 40 and 52. Such a construction is entirely free of the difficulty in earlier instruments of obtaining and thereafter maintaining a hinge which will always allow the cover to assume its intended closed position. The hinged cover of the present construction by having a three point engagement with member 28 and some freedom for lateral tilting at the connection 50 will always assume a proper closed position when pressed downwardly by the finger of the operator. An opening 28'' is provided at the front end of the housing 28 and in proper relation to the front surface 40' of the prism 40 for the dual purpose of admitting a little stray light for illuminating the dark part of the scale when the instrument is being used with transmitted light, and for the purpose of allowing light to enter for measuring purposes when turbid materials or such are contained in the measuring chamber.

An armored insulated electric conductor 56 has one end operatively connected to a removable bulb supporting plug 58 carried by cover 48, has a part near the plug anchored to the cover as at 59, and extends loosely therefrom rearwardly and then across the top of the instrument adjacent the end plate 14 and is secured thereto as indicated at 59' so as to allow free hinging movement of the cover 48 and links 46. The conductor then extends downwardly and into the body of the instrument through a central opening in the front plate 14 so that it may be connected with a battery contacting member 60 (see Fig. 4). The contact member 60, as well as battery contact members 62 and 64 are riveted or otherwise fixedly secured to an insulating plate 66 and this plate is then secured to the hinged bottom member 18 by rivets or the like; there being a second insulating sheet or plate 68 interposed between plate 66 and the member 18 so that no contact will occur between this member and the rivets holding the contact members. A pair of batteries 69 thus may be positioned and retained between contact members 60 and 62 and between members 62 and 64 respectively. The contact member 64 has one end in operative connection with a limiting arm 70 which overlies a free end of the latch 22 so as to be contacted thereby when a push button 74, which extends outwardly through an opening in the bottom member 18, is pressed for energizing the light source 54. The armored cable 56 has its metallic sheath anchored at one end to the cover 48 by connector 59 and its opposite end connected by suitable means (not shown) to latch bar 22 and thus an electric circuit will be formed for energizing bulb 54.

As already stated, the graduated scale or reticule 32' is positioned substantially at the rear focal plane of the objective lens system of the instrument. If all readings could be made at a constant temperature this scale or reticule could be properly graduated to give accurate indications of the percentage concentration or of the refractive index of the solutions being measured even though this scale would not be a linear scale. However, temperature, as is well known, also has a material effect upon the refractive index of solutions and accordingly must be compensated for before an accurate measurement can be obtained. It has been found, as stated in the copending application mentioned above, that the scale or reticule of a refractometer or like instrument may be mounted to swing about a predetermined axis laterally offset from but parallel to the optical axis of the instrument and this scale so proportioned and angularly disposed with reference to this axis that proper compensation for temperature may be effected automatically when actuated by suitable temperature responsive means.

However, in a refractometer of the type being described herein and intended to be handled repeatedly, it is essential to provide an arrangement and construction of parts which will be sturdy, and compact and in which all the necessary adjustment for high precision measurements may be readily made. To accomplish this, a pintle 76 is held in fixed, spaced, parallel relation to the optical axis 30' by means of a pair of brackets 78 and 79 secured to and extending outwardly from the tubular wall 24 and upon this pintle 76 is mounted a radial arm 80 which extends inwardly of the member 24 through an opening 82. The inner end of this arm is in the shape of a supporting ring in which is carried the screen 32, previously mentioned. An apertured shield 33 may also be carried by this ring and serve to limit the field of the eye lens as well as to always show the scale centered in the field. Also carried upon the pintle 76 are a pair of restraining collars 84 one of which biases arm 80 toward bracket 79 and into the other of which extends an end of a biasing spring 85 which encircles the pintle and has its opposite end in pressing engagement with one side of the arm 80. This spring is of a relatively light weight but is sufficient to always press the arm 80 in a desired direction and maintain it in contact with a temperature responsive element 86.

This temperature responsive element is in the form of bi-metal helical coil having a free end thereof in pressing engagement with a relatively stiff spring finger 88 carried by the arm 80. The opposite end of this relatively long helical bimetal element is releasably clamped by a plate 90 and screw 92 to an adjustable ring 94 so that the effective or working length of the helical element from the clamp to its free end may be accurately proportioned to give the amount of angular movement desired for arm 80 per degree of temperature change. In order that the bi-metal element 86 may be adjusted into proper engagement with the finger 88 after its working length has been obtained, a collar 94 is provided with a releasable locking screw 96 which may be used to swing the collar 94 and thus the element 86 angularly about the optical axis 30' until the scale 32', on arm 80 swinging about the pintle 76 is in proper position. This rotational adjustment of the ring 94 and locking screw 96 is possible since a helical or angularly disposed slot 98 (see Fig. 3) is provided in wall 24 and through which screw 96 extends. It will be noted that the lead angle of this slot is substantially the same as that of the element 86, so that for any position of adjustment of the ring 94 the free end of the helical element 86 will always have substantially the same point of contact with the spring arm 88.

By having merely a pressing engagement between the free end of the bi-metal element 86 and the relatively stiff spring arm 88, normal expansions and contractions of the element 86 will not transmit to the scale or reticule 32' any pressure which might tend to move the scale 32' out of the focal plane of the objective 30. Furthermore, this pressing engagement between members 86 and 88 allows the bi-metal element 86 to move away from the arm 88, if necessary, or allows it to press against arm 88 and flex this relatively stiff arm when necessary, should the instrument ever be allowed to remain in a location where the ambient temperature might become abnormally high or low; thereby avoiding injury to any of the sensitive parts of the instrument.

A shield 99 of suitable shape may be positioned about the brackets 78, 79 and secured in place against end plate 12 and tube 24 so as to protect the temperature compensating parts of the instrument as well as to help seal the optical elements within this tube from dust and the like. It should be noted, furthermore, that by having the walls 16 and 24 slightly spaced and the element 86 spaced slightly from wall 24 as well as enclosed thereby, fluctuating changes in temperature of the outside air or due to the hand of the operator on the instrument will have no immediate influence upon the bi-metal element 86 and thus will not materially effect the readings obtained.

Having described our invention, we claim:

1. A refractometer comprising an elongated generally tubular support, a measuring prism carried in fixed relation to an adjacent one end of said support, an objective lens system within said tubular support and in substantial optical alignment with said prism so as to focus light rays from said prism at a predetermined focal plane for establishing a boundary line of total reflection, a measuring scale for indicating indices of refraction aligned with said objective and disposed substantially in said focal plane, means carried in fixed relation to said tubular support and supporting said scale for transverse movement relative to the optical axis of said objective and in a direction at an angle to said boundary line, and elongated temperature responsive means within said tubular support and extending in a curved path around said light rays and optical axis and within said tubular support and having a portion adjacent one end thereof operatively secured in fixed relation to said tubular support and a portion near the opposite end thereof arranged in operative relation to said scale supporting means so as to move said scale predetermined amounts relative to the optical axis of said lens system in response to predetermined temperature changes of said refractometer.

2. A refractometer comprising an elongated generally tubular support, a measuring prism carried in fixed relation to and adjacent one end of said support, an objective lens system within said tubular support and in substantial optical alignment with said prism so as to focus light from said prism at a predetermined focal plane for establishing a boundary line of total reflection, a measuring scale for indicating indices of refraction aligned with said objective disposed substantially in said focal plane, means carried in fixed relation to said tubular support and supporting said scale for transverse movement relative to the optical axis of said objective and in a direction at an angle to said boundary line, an elongated helically shaped temperature responsive element within said tubular support, and means for securing a portion of said element to said support so that another portion thereof will be in operative relation to said scale supporting means for moving said scale predetermined amounts relative to the optical axis of said lens system in response to predetermined temperature changes of said refractometer.

3. A refractometer comprising an elongated generally tubular support, a measuring prism carried in fixed relation to and adjacent one end of said support, an objective lens system within said tubular support and in substantial optical alignment with said prism so as to focus light from said prism at a predetermined focal plane for establishing a boundary line of total reflection, a measuring scale for indicating indices of refraction aligned with said objective and disposed substantially in said focal plane, means carried in fixed relation to said tubular support and supporting said scale for transverse movement relative to the optical axis of said objective and in a direction at an angle to said boundary line, an elongated helically shaped temperature responsive element within said tubular support, means for securing a portion of said temperature responsive element to said tubular support so that a free end portion thereof will be in a position to engage said scale supporting means, and resilient means for urging said scale supporting means into engagement with said free end portion, whereby said temperature responsive means may move said scale predetermind small amounts relative to the optical axis of said objective lens system in response to predetermined temperature changes of said refractometer.

4. A refractometer comprising an elongated generally tubular support, a measuring prism carried in fixed relation to and adjacent one end of said support, an objective lens system within said tubular support and in substantial optical alignment with said prism so as to focus light from said prism at a predetermined focal plane for establishing a boundary line of total reflection, a measuring scale for indicating indices of refraction aligned with said objective and disposed substantially in said focal plane, means carried in fixed relation to said tubular support and supporting said scale for transverse movement relative to the optical axis of said objective and in a direction at an angle to said boundary line, an elongated helically shaped temperature responsive element within said tubular support, a relatively stiff yieldable arm carried by said scale supporting means, resilient means for urging said scale supporting means in a predetermined direction, and means for securing a portion of said temperature responsive element to said tubular support so that a free end portion thereof abuts said stiff arm for moving said scale predetermined small amounts relative to the optical axis of said lens system in response to predetermined temperature changes within said refractometer.

5. A refractometer comprising an elongated generally tubular support, a measuring prism carried in fixed relation to and adjacent one end of said support, an objective lens system within said tubular support and in substantial optical alignment with said prism so as to focus light from said prism at a predetermined focal plane for establishing a boundary line of total reflection, a measuring scale for indicating indices of refraction aligned with said objective and disposed substantially in said focal plane, means carried in fixed relation to said tubular support and supporting said scale for transverse movement relative to the optical axis of said objective and in a direction at an angle to said boundary line, an elongated helically shaped temperature responsive element within said tubular support, resilient means for urging said scale supporting means in a predetermined direction, a clamp for engaging said temperature responsive element so as to allow a free end portion of proper length to extend toward said scale supporting means, means for adjustably securing said clamp to said tubular support so that said free end may be moved into proper operative relation to said scale supporting means for moving said scale predetermined amounts relative to the optical axis of said lens system in response to predetermined temperature changes of said refractometer.

6. A refractometer comprising an elongated generally tubular support, a measuring prism carried in fixed relation to and adjacent one end of said support, a lens cell rotatably carried in said tubular support, an objective lens system carried by said cell, the optical axis of said lens system being substantially parallel but eccentric with respect to the axis of rotation of said cell, said lens system also being in substantial optical alignment with said prism so as to focus light from said prism at a predetermined focal plane for establishing a boundary line of total reflection, a measuring scale for indicating indices of refraction aligned with said objective and disposed substantially in said focal plane, adjustable rotation of said cell serving to shift said boundary line a slight amount for causing said line, when indicating a predetermined index at a predetermined temperature, to move into coincidence with a preselected graduation of said scale, means carried in fixed relation to said tubular support and supporting said scale for transverse movement relative to the optical axis of said objective and in a direction at an angle to said boundary line, and temperature responsive means within said tubular support and arranged in operative relation to said scale supporting means so as to move said scale predetermined amounts relative to the optical axis of said lens system in response to predetermined temperature changes of said refractometer.

7. A refractometer comprising an elongated generally tubular support, a measuring prism carried in fixed relation to and adjacent one end of said support, an objective within said end of said tubular support and in substantial optical alignment with said prism so as to focus light from said prism at a predetermined focal plane for establishing a boundary line of total reflection, a measuring scale for indicating indices of refraction aligned with said objective and disposed substantially in said focal plane, means carried in fixed relation to said tubular support and supporting said scale for transverse movement relative to the optical axis of said objective and in a direction at an angle to said boundary line, temperature responsive means within said tubular support and arranged in operative relation to said scale supporting means so as to move said scale predetermined amounts relative to the optical axis of said lens system in response to predetermined temperature changes of said refractometer, sighting means adjacent the other end of said tubular support, said sighting means and objective jointly serving to substantially close opposite ends of said tubular support, a pair of end plates secured in spaced relation to said tubular support, and a wall surrounding said tubular support in spaced relation thereto and engaging said end plates for effecting therewith a substantially completely enclosed protective housing for said temperature responsive means and operating parts associated therewith.

8. A refractometer comprising an elongated generally tubular support, a measuring prism carried in fixed relation to and adjacent one end of said support, an objective within said tubular support and in substantial optical alignment with said prism so as to focus light from said prism at a predetermined focal plane for establishing a boundary line of total reflection, a measuring scale for indicating indices of refraction aligned with said objective and disposed substantially in said focal plane, means carried in fixed relation to said tubular support and supporting said scale for transverse movement relative to the optical axis of said objective and in a direction at an angle to said boundary line, and temperature responsive means within said tubular support and arranged in operative relation to said scale supporting means so as to move said scale predetermined amounts relative to the optical axis of said lens system in response to predetermined temperature changes of said refractometer, illuminating means for said measuring prism secured to said refractometer and including electrical conductors, a switch and an electric bulb, a pair of end plates secured to spaced portions of said tubular support, a wall surrounding said tubular support and engaging said end plates so as to form therewith an outer housing having a part in spaced relation to said tubular support to define a battery chamber therebetween, said switch being accessible from the exterior of said housing for controlling the supply of current to said bulb.

9. A refractometer comprising an elongated generally tubular support, a measuring prism carried in fixed relation to and adjacent one end of said support, an objective within said end of said tubular support and in substantial optical alignment with said prism so as to focus light from said prism at a predetermined focal plane for establishing a boundary line of total reflection, a measuring scale for indicating indices of refraction aligned with said objective and disposed substantially in said focal plane, means carried in fixed relation to said tubular support and supporting said scale for transverse movement relative to the optical axis of said objective and in a direction at an angle to said boundary line, and temperature responsive means within said tubular support and arranged in operative relation to said scale supporting means so as to move said scale predetermined amounts relative to the optical axis of said lens system in response to predetermined temperature changes of said refractometer, sighting means adjacent the other end of said tubular support, said sighting means and objective jointly serving to substantially close opposite ends of said tubular support, a pair of end plates secured in spaced relation to said tubular support, a wall surrounding said tubular support in spaced relation thereto and engaging said end plates for effecting therewith a substantially dust-proof enclosure and heat insulating means for said temperature responsive means, illuminating means for said measuring prism secured to said refractometer and including an electric bulb, electric conductors and a switch, said outer wall providing a chamber for dry cell batteries, said switch being accessible from the exterior of said housing for controlling the supply of current to said housing.

10. In a refractometer or like measuring instrument, the combination of a measuring prism having a specimen contacting surface formed thereon, an illuminating prism having a specimen contacting surface formed thereon, means for supporting one of said prisms in a relatively fixed position in said instrument, interconnecting means for supporting the other of said prisms so that it may be readily moved from an operative position with its contacting surface closely adjacent the contacting surface of the fixed prism to an inoperative position materially spaced therefrom, said interconnecting means comprising a pair of link members pivotally secured adjacent one end to a fixed part of said instrument and having slot-and-pin connections adjacent the opposite end thereof for securing said members to said movable prism, said slot-and-pin connections allowing at least small amounts of fore and aft tilting movement as well as lateral tilting movement of said movable prism relative to said fixed prism, and spacing means operatively associated with said fixed and movable prisms and comprising three relatively small projections carried in fixed relation to one or the other of said prisms and arranged in triangularly spaced relation to each other so as to provide, when the prisms are in operative relation to each other, a three-point spacing means therefor effecting a specimen-receiving chamber of predetermined thickness between said contacting surfaces.

PAUL ROSENTHAL.
    MICHAEL L. POLANYI.
    NATHAN GOTTLIEB.

REFERENCES CITED

The following references are of record in the file of this patent:

UNITED STATES PATENTS

| Number | Name | Date |
| --- | --- | --- |
| 620,978 | Schupmann | Mar. 14, 1899 |
| 1,522,639 | Lowe | Jan. 13, 1925 |
| 1,584,271 | Bertele | May 11, 1926 |
| 1,760,209 | Pfeiffer | May 27, 1930 |
| 2,002,183 | Lecarpentier | May 21, 1935 |
| 2,142,668 | Bucy | Jan. 3, 1939 |
| 2,168,353 | Linebarger | Aug. 8, 1939 |
| 2,224,726 | Finnegan et al. | Dec. 10, 1940 |
| 2,267,115 | Linebarger | Dec. 23, 1941 |
| 2,319,889 | Straat | May 25, 1943 |
| 2,394,949 | Straat | Feb. 12, 1946 |
| 2,441,107 | Turner | May 4, 1948 |
| 2,445,499 | Silge | July 20, 1948 |
| 2,474,044 | Forrest | June 21, 1949 |